Sept. 20, 1949.         J. J. WACHTER         2,482,525
ODORLESS PHENOL-FORMALDEHYDE RESINOUS PRODUCTS
Filed Oct. 19, 1945
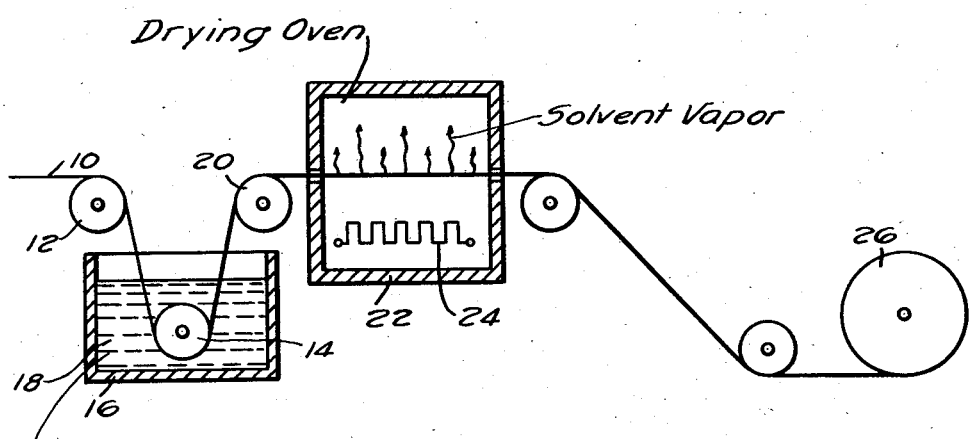
Varnish Composed of Phenol-formaldehyde, Solvent, water and inorganic basic accelerator.
WITNESSES:
INVENTOR
Joseph J. Wachter.

Patented Sept. 20, 1949

2,482,525

UNITED STATES PATENT OFFICE 2,482,525

ODORLESS PHENOL-FORMALDEHYDE RESINOUS PRODUCTS

Joseph J. Wachter, Wilkinsburg, Pa., assignor to Westinghouse Electric Corporation, East Pittsburgh, Pa., a corporation of Pennsylvania Application October 19, 1945, Serial No. 623,280

8 Claims. (Cl. 260—29.3)

This invention relates to the preparation of certain phenol-formaldehyde resins, which, when thermoset, are characterized by an extremely low odor level. These resins, when applied to fibrous materials, enable the preparation of molded and laminated products suitable for use in household appliances and similar devices requiring a low odor level.

In my copending patent application Serial No. 571,024, filed January 1, 1945, now Patent Number 2,465,299 there is described a phenol-formaldehyde resin which has been characterized by an inherently low odor level. The present application relates to an improvement in the nature of the phenol-formaldehyde resin when made into a varnish whereby superior physical properties of the thermoset final product are obtained. In particular, the moisture absorption and dimensional stability are greatly improved by the present invention. In addition, the processing time is greatly reduced.

The object of this invention is to provide a phenol-formaldehyde resin composition characterized by good penetration of cellulosic materials and an exceptionally low odor level when thermoset.

Another object of the invention is to provide for expediting the processing of laminated members comprising a phenolic resin and a cellulosic material.

A further object of the invention is to provide for the preparation of a molded product from a phenol-formaldehyde resin and cellulosic material having good dimensional stability, low moisture absorption and low odor level.

Other objects of the invention will, in part, be obvious and will, in part, appear hereinafter. For a better understanding of the nature of the object of the invention, reference should be had to the following detailed description and the single figure of the drawing illustrating a schematic process for preparing coated cellulosic sheet material.

An inherently low odor level phenol-formaldehyde resin is prepared by reacting one mol of phenol with from 1.15 to 1.35 mols of formaldehyde in the presence of an amine catalyst. Aqueous solutions of formaldehyde or para-formaldehyde or substances engendering formaldehyde or mixtures of any of these substances may be employed. By phenol I refer to hydroxy-benzene alone. The substitution of other homologues of hydroxy-benzene increases the amount of objectionable odor present in the final product. The ratio of phenol to formaldehyde is critical and any appreciable departure from the range set forth will rapidly increase the objectionable odor level of the resulting resin.

In reacting the phenol and formaldehyde, it has been found that a relatively low proportion of amine catalyst gives the preferred results. In particular, ethylene diamine in an amount of from 0.45 per cent to 0.55 per cent of the weight of the phenol gives the best results as the catalyst. Other amine catalysts with the respective proportions producing an equivalent effect are given in the following table:

Table I

| Catalyst | Amount based on phenol used |
|---|---|
|  | Percent |
| Ethylene Diamine | 0.45 to 0.55 |
| Hexamethylene Tetramine | 1.15 to 1.35 |
| Dimethyl Amine | 0.7 to 0.8 |
| Methyl Amine | 0.9 to 1.1 |
| Ethyl Amine | 1.4 to 1.6 |

It will be apparent from these examples that the proportion of each amine catalyst may be varied within a narrow range. The amount to be employed of any amine obviously depends on its activity as a catalyst.

As an example of the preparation of the resin, the following is typical:

Table II

Phenol (synthetic) _____ 1.0 mol
Formaldehyde (38% aqueous solution) _____ 1.25 mols
Ethylene diamine (70% aqueous solution) _____ 0.5% of weight of phenol The phenol, formaldehyde and the amine catalyst are placed in a reaction vessel equipped with a heater and a reflux column. The reactants are heated at a temperature of from 90° C. to 100° C. and allowed to reflux for a period of time of from 90 minutes to 135 minutes, with a reflux time of 120 minutes appearing to give the optimum results. At the end of the refluxing period, the reaction vessel is connected to a vacuum pump and the absolute pressure is rapidly reduced to about 0.2 atmosphere absolute pressure or less. The temperature of the resin drops below 100° C. during the initial stage of distillation and rises slowly as evacuation proceeds. It should not appreciably exceed 150° C. As 150° C. is exceeded the resin rapidly becomes solvent-insoluble and then thermosets. As low polymers of phenol-formaldehyde are distilled off, the vacuum may be increased to an absolute pressure of as low as 0.01 atmosphere. In one particular case involving the reactants of Table II distillation was initiated at an absolute pressure of 40 millimeters of mercury and continued until an absolute pressure of 20 millimeters of mercury at a temperature of 150° C. was attained. During evacuation any unreacted phenol, formaldehyde, water and other volatile ingredients, as well as low polymers, are removed. The resin is in the so-called A-stage.

After distillation, an organic solvent is added to kill the reaction, and to dissolve the reaction product. A great variety of organic solvents may be employed. Ethanol, ethyl acetate, acetone, methyl-ethyl ketone, benzene, xylene, ethylene glycol and mixtures may be employed in producing a phenol-formaldehyde varnish for impregnating purposes. Solutions of any desirable resin content may be produced. A solution having from 40 per cent to 60 per cent by weight of resin solids forms a varnish with a viscosity suited for most impregnating applications.

However, a varnish containing only organic solvents has been found to be unsatisfactory in some respects for impregnating cellulosic fibrous materials. In particular, the penetration of the varnish into cellulosic materials is not as adequate as is desired when using a phenol-formaldehyde varnish containing only an organic solvent. Tests have indicated that the molded products embodying this type of varnish have a relatively high moisture absorption and other physical properties are somewhat inferior to what is desired.

According to the present invention, it has been discovered that the addition of water to the varnish to produce a composition containing a phenol-formaldehyde resin, organic solvent and water within certain proportions enables the production of laminated members of unusually low moisture absorption and with greatly improved physical properties. In particular, it has been found that a varnish having unusually good properties may be prepared with from about 40 per cent to 180 per cent of organic solvent, and from 10 per cent to 100 per cent of water based on the weight of the phenol-formaldehyde resin. Typical formulations comprise 100 parts by weight of the final reaction product of Table II, plus 25 parts of water, plus 125 parts of any of the organic solvents in the following table:

*Table III*

Ethanol
Ethyl acetate
Methyl acetate
Butyl acetate
Acetone
Methyl-ethyl ketone
Di-acetone alcohol
Di-ethyl ketone
Methanol
Propyl alcohol
Butyl alcohol
50/50 mixture ethanol and benzene
50/50 mixture ethanol and xylene
50/50 mixture carbitol and ethanol
Di-ethylene glycol
50/50 mixture petroleum ether and ethanol
50/50 mixture carbon tetrachloride and ethanol
50/50 mixture chloroform and ethanol The water may be added as a part of the organic solvent, for example, as 70 per cent ethanol; or it may be added before or after the organic solvent is admixed with the A-stage resin.

As a specific example, 700 pounds of the resin of Table II was put into solution with 700 pounds of ethanol and then 140 pounds of water was added. Before the addition of the water, the viscosity of the varnish was 237 centipoises, and the set time was 24.6 minutes. After the addition of the water, the viscosity was 120 centipoises and the set time was 18.6 minutes. These improvements in properties are quite desirable. The resin varnish, with and without water, was employed to treat 5 mil kraft paper to a resin content equal to from 75 per cent to 85 per cent of the weight of the paper. Panels 43 inches by 32 inches by 1/16 of an inch in thickness were molded from the treated kraft paper. The following changes in physical properties were exhibited by the respective panels after immersion for 24 hours in water at 25° C.

*Table IV*

| | Kraft Paper Panels Made From Resin Without Water, Percent | Kraft Paper Panels Made From Resins Containing Water, Percent |
|---|---|---|
| Moisture Absorption | 2.38 | 1.04 |
| Edge Swelling | 5.12 | 2.28 |
| Center Swelling | 1.87 | .496 |
| Increase Across Grain | .099 | .083 |
| Increase With Grain | .052 | .045 |

It will be obvious from the above table that a very substantial decrease in moisture absorption and swelling of the laminate has been secured by the addition of water to the varnish.

A further characteristic discovered by testing of the panels produced from the phenolic varnish containing added water is a substantial decrease in flexibility under a given load. This feature is highly desirable and similar test samples cut from the panels as produced for Table IV showed the following cantilever beam deflections: under a load of 6 pounds, the panel prepared from the varnish having no water present deflected 32½° whereas the panel prepared from the varnish containing water deflected only 29½°.

It has been found that further improvements in processing the phenolic resin may be effected by adding an inorganic basic accelerator to the varnish containing water. From 0.2 per cent to 5 per cent of an inorganic basic accelerator based on the weight of the resin solids may be added to the varnish to expedite the curing of the resin. Examples of suitable inorganic basic accelerators are sodium hydroxide, potassium hydroxide, sodium carbonate, potassium carbonate, barium hydroxide, calcium hydroxide, barium carbonate, calcium carbonate and sodium bicarbonate. Alkali and alkaline earth metal hydroxides, carbonates and bicarbonates may be made use of in general.

The benefits of the inorganic basic accelerators include much more rapid polymerization to the B-stage of the varnish composition when applied to cellulosic materials in the tower thereby permitting higher tower speeds without requiring higher temperatures. The shelf life of the tower product, however, is not materially affected. The outstanding advantage, however, is secured during molding of laminates from cellulosic sheet material treated with the phenolic resin containing the basic accelerator. Completely cured, odorless laminates have been secured in less than one-third the time required using the same resin with no inorganic basic accelerator employed.

The following example is typical:

Table V

| | | |
|---|---|---|
| Phenol | Pounds | 1350 |
| Formaldehyde—37% solution | do | 1460 |
| Ethylene diamine | grams | 3050 | were mixed in a heated reaction vessel provided with a reflux condenser. The mixture was refluxed at a temperature of from 90° C. to 100° C. for a period of time of from 90 minutes to 135 minutes. Thereafter vacuum was applied and the temperature dropped, the temperature increased slowly to 105° C. to 110° C. at the termination of the evacuation.

To the evacuated resin, 450 pounds of water and 110 to 115 gallons of ethanol were added. The solution was cooled to 50° C. and a solution composed of 75 pounds of water and 9 pounds of sodium hydroxide was added.

Five mil thick kraft paper was impregnated with 75 per cent to 85 per cent of its weight of the resin solids by applying the composition of Table V. The phenolic resin reached the B-stage in about half the time. The treated paper was then cut and laminates 1/16 of an inch thick were prepared therefrom in a greatly reduced time under heat and pressure. Comparative tests indicated the following improvements between resin with and without the accelerator.

Table VI

| NaOH | Tower Speed | Time to Cure 1/16" panel at 180° C. |
|---|---|---|
| Per cent | Inches/minute | Minutes |
| 0 | 250 | 30 |
| 0.6 | 400 | 6 |

The tower temperatures were roughly the same in both cases.

While as little as 0.2 per cent of the inorganic basic accelerator may be used, it has been found that optimum savings in time with a highly satisfactory product being secured are obtained if sufficient alkali hydroxide equal to from 0.5 to 1.0 per cent of the weight of the resin is employed.

The phenol-formaldehyde resin of the invention may be applied to cellulosic material in various proportions. As little resin as 40 per cent or as much as 125 per cent of the weight of the cellulosic material may be applied with useful laminated products being obtainable.

Referring to the figure in the drawing, there is illustrated a typical phenolic varnish impregnating apparatus for practicing the present invention. The sheet 10 of a cellulosic fibrous material, such, for example, as paper, cotton cloth or the like, passes over the roll 12, then downwardly under roll 14 disposed in the tank 16 carrying the phenol-formaldehyde varnish 18 whereby the sheet 10 is coated with the varnish composed of phenol-formaldehyde resin, organic solvent, water and inorganic basic accelerator. The water appears to wet and swell the cellulosic fibrous material so that the varnish will penetrate to a greater extent than would be possible were an all organic solvent to be employed. Thereafter the impregnating sheet material 10 passes over the roll 20 into the oven 22 provided with heating elements 24. When heated in the oven, the water in the varnish solution penetrates rapidly into the cellulosic fibers and carries resin into the interstices as well as the fibers themselves. Thereafter the heat evaporates the organic solvent and water leaving the resin distributed intimately in the fibers and further polymerizes the phenolic resin at a high rate of speed due to the accelerator. The sheet material, after passing from the oven 22, carries a coating of phenolic resin in the B-stage and may be wound up on a roll 26 for subsequent use. The rolls 26 do not deteriorate unduly on storage for long periods of time. The sheet material on roll 26 may be unwound as required and cut into sheets of predetermined shape. A plurality of cut layers of the impregnated sheet material may be superimposed and subjected to a pressure of from 500 pounds to 5000 pounds per square inch, and heated to a temperature of from 135° C. to 180° C. for a period of time sufficient to convert the resin to the infusible or thermoset state. During the heating and pressing, the phenolic resin in the fibrous material temporarily fuses and spreads between the cellulosic fibers and soon thereafter polymerizes more fully to the thermoset stage where it binds the fibrous material into a unitary member. In some cases, the heat treatment may be effected by employing a high frequency electrical field while the superimposed sheets are maintained under pressure. The resin impregnated sheet material on roll 26 may be chopped or macerated or otherwise formed into a suitable physical shape to produce the required molded product.

A particularly desirable application for the resin of this invention is in the preparation of refrigerator door panels. The door panels are placed at the inside of the refrigerator doors where they serve structural functions, and retain heat insulation in place, as well as having some heat insulating value. Due to the low odor level of the phenol-formaldehyde resin produced according to the invention, no special effort need be made to apply any surface coating in an attempt to seal in undesirable phenolic odors. Since phenol-formaldehyde resins ordinarily are available only as relatively dark materials, the refrigerator door panels may be painted or otherwise coated with some enamel or other material in order to produce a decorative or light colored surface coating. However, no special effort is required to provide surface coating to prevent odor penetration in using the resin of this invention.

Obviously, the use of the present resin in making refrigerator door panels is only one desirable use. Moldings to be used wherever food is handled or personal contact is made may employ the resinous products herein described to advantage.

Since certain changes may be made in the above invention and different embodiments of the invention may be made without departing from the scope thereof, it is intended that all matter contained in the above-described disclosure shall be interpreted as illustrative and not in a limiting sense.

I claim as my invention:

1. A composition composed of the reaction product of 1.0 mols of phenol, 1.15 to 1.35 mols of formaldehyde in aqueous solution heated to 100° C. and refluxed for from 1.5 to 2.25 hours in the presence of a catalyst composed of from 0.45 per cent to 0.55 per cent of ethylene diamine based on the weight of the phenol, the refluxed product being subjected to evacuation and distillation to an absolute pressure of from 0.2 to 0.01 atmospheres while at a temperature of above 100° C. but not materially exceeding 150° C., a water miscible volatile liquid organic solvent in an amount of from 40 per cent to 180 per cent of the weight of the reaction product and water from 10 per cent to 100 per cent of the weight of the reaction product.

2. A composition composed of the reaction product of 1.0 mols of phenol, 1.15 to 1.35 mols of formaldehyde in aqueous solution heated to 100° C. and refluxed for from 1.5 to 2.25 hours in the presence of a catalyst composed of from 0.45 per cent to 0.55 per cent of ethylene diamine based on the weight of the phenol, the refluxed product being subjected to evacuation and distillation to an absolute pressure of from 0.2 to 0.01 atmospheres while at a temperature of above 100° C. but not materially exceeding 150° C., a water miscible volatile liquid organic solvent in an amount of from 40 per cent to 180 per cent of the weight of the reaction product, water from 10 per cent to 100 per cent of the weight of the reaction product, and 0.2 per cent to 5 per cent of an inorganic basic accelerator from the group consisting of alkali metal hydroxides, carbonates and bicarbonates, and alkaline earth metal hydroxides and carbonates based on the weight of the reaction product.

3. A composition composed of the reaction product of 1.0 mols of phenol, 1.15 to 1.35 mols of formaldehyde in aqueous solution heated to 100° C. and refluxed for from 1.5 to 2.25 hours in the presence of a catalyst composed of from 0.45 per cent to 0.55 per cent of ethylene diamine based on the weight of the phenol, the refluxed product being subjected to evacuation and distillation to an absolute pressure of from 0.2 to 0.01 atmospheres while at a temperature of above 100° C. but not materially exceeding 150° C., ethyl alcohol in an amount of from 40 per cent to 180 per cent of the weight of the reaction product and water from 10 per cent to 100 per cent of the weight of the reaction product.

4. A composition composed of the reaction product of 1.0 mols of phenol, 1.15 to 1.35 mols of formaldehyde in aqueous solution heated to 100° C. and refluxed for from 1.5 to 2.25 hours in the presence of a catalyst composed of from 0.45 per cent to 0.55 per cent of ethylene diamine based on the weight of the phenol, the refluxed product being subjected to evacuation and distillation to an absolute pressure of from 0.2 to 0.01 atmospheres while at a temperature of above 100° C. but not materially exceeding 150° C., ethyl alcohol in an amount of from 40 per cent to 180 per cent of the weight of the reaction product, water from 10 per cent to 100 per cent of the weight of the reaction product, and from 0.5 per cent to 1. per cent of a basic accelerator selected from the group consisting of alkali metal hydroxides, carbonates and bicarbonates and alkaline earth metal hydroxides and carbonates, based on the weight of the reaction product.

5. A composition composed of the reaction product of 1.0 mols of phenol, 1.15 to 1.35 mols of formaldehyde in aqueous solution heated to 100° C. and refluxed for from 1.5 to 2.25 hours in the presence of a catalyst composed of an organic amine from the group consisting of ethylene diamine in an amount of between 0.45% and 0.55%, hexamethylenetetramine in an amount of between 1.15% and 1.35%, dimethyl amine in an amount of between 0.7% and 0.8%, methyl amine in an amount of between 0.9% and 1.1% and ethyl amine in an amount of between 1.4% and 1.6%, the said amounts based on the weight of the phenol, the refluxed product being subjected to evacuation and distillation to an absolute pressure of from 0.29 to 0.01 atmospheres while at a temperature of above 100° C. but not materially exceeding 150° C., a water miscible volatile liquid organic solvent for the reaction product, the organic solvent being in an amount of from about 40 per cent to 180 per cent of the weight of the reaction product and water from 10 per cent to 100 per cent of the weight of the reaction product.

6. A composition composed of the reaction product of 1.0 mols of phenol, 1.15 to 1.35 mols of formaldehyde in aqueous solution heated to 100° C. and refluxed for from 1.5 to 2.25 hours in the presence of a catalyst composed of an organic amine from the group consisting of ethylene diamine in an amount of between 0.45% and 0.55%, hexamethylenetetramine in an amount of between 1.15% and 1.35%, dimethyl amine in an amount of between 0.7% and 0.8%, methyl amine in an amount of between 0.9% and 1.1% and ethyl amine in an amount of between 1.4% and 1.6%, the said amounts based on the weight of the phenol, the refluxed product being subjected to evacuation and distillation to an absolute pressure of from 0.2 to 0.01 atmospheres while at a temperature of above 100° C. but not materially exceeding 150° C., a water miscible volatile liquid organic solvent for the reaction product, the organic solvent being in an amount of from 40 per cent to 180 per cent of the weight of the reaction product, water from 10 per cent to 100 per cent of the weight of the reaction product, and from 0.2 per cent to 5. per cent of an inorganic basic accelerator selected from the group consisting of the alkali metal hydroxides, carbonates and bicarbonates and alkaline earth metal hydroxides, and carbonates based on the weight of the reaction product.

7. An article of manufacture comprising in combination, a cellulosic fibrous material and a phenol-formaldehyde resin applied thereto, the phenol-formaldehyde resin impregnating the cellulosic fibers, the phenol-formaldehyde resin derived by applying to the cellulosic fibrous material a solution composed of the reaction product of 1.0 mols of phenol, 1.15 to 1.35 mols of formaldehyde in aqueous solution heated to 100° C. and refluxed for from 1.5 to 2.25 hours in the presence of a catalyst composed of from 0.45 per cent to 0.55 per cent of ethylene diamine based on the weight of the phenol, the refluxed product being subjected to evacuation and distillation to an absolute pressure of from 0.2 to 0.01 atmospheres while at a temperature of above 100° C. but not materially exceeding 150° C., a water miscible volatile liquid organic solvent in an amount of from 40 per cent to 180 per cent of the weight of the reaction product and water from 10 per cent to 100 per cent of the weight of the reaction product, and heat treating the solution of resin to a thermoset state.

8. An article of manufacture comprising in combination, a cellulosic fibrous material and a phenol-formaldehyde resin applied thereto, the phenol-formaldehyde resin impregnating the cellulosic fibers, the phenol-formaldehyde resin derived by applying to the cellulosic fibrous material a solution composed of the reaction product of 1.0 mols of phenol, 1.15 to 1.35 mols of formaldehyde in aqueous solution heated to 100° C. and refluxed for from 1.5 to 2.25 hours in the presence of a catalyst composed of an organic amine from the group consisting of ethylene diamine in an amount of between 0.45% and 0.55%, hexamethylenetetramine in an amount of between 1.15% and 1.35%, dimethyl amine in an amount of between 0.7% and 0.8%, methyl amine in an amount of between 0.9% and 1.1% and ethyl amine in an amount of between 1.4% and 1.6%, the said amounts based on the weight of the phenol, the refluxed product being subjected to evacuation and distillation to an absolute pressure of from 0.2 to 0.01 atmospheres while at a temperature of above 100° C. but not materially exceeding 150° C., a water miscible volatile liquid organic solvent in an amount of from 40 per cent to 180 per cent of the weight of the reaction product and water from 10 per cent to 100 per cent of the weight of the reaction product, and heat treating the solution of resin to a thermoset state.

JOSEPH J. WACHTER.

REFERENCES CITED

The following references are of record in the file of this patent:

UNITED STATES PATENTS

| Number | Name | Date |
|---|---|---|
| 2,245,245 | Alexander | June 10, 1941 |
| 2,383,430 | Weltman | Apr. 21, 1945 |

FOREIGN PATENTS

| Number | Country | Date |
|---|---|---|
| 478,988 | Great Britain | Jan. 28, 1938 |